E. H. MESSITER.
COMPOSITE MAGNETIZABLE MATERIAL.
APPLICATION FILED NOV. 8, 1912.
1,121,859.
Patented Dec. 22, 1914.
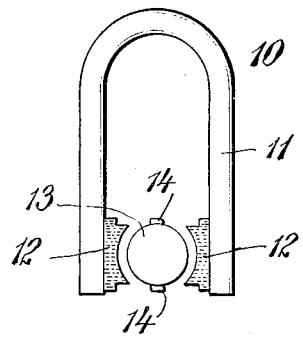
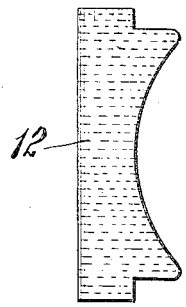
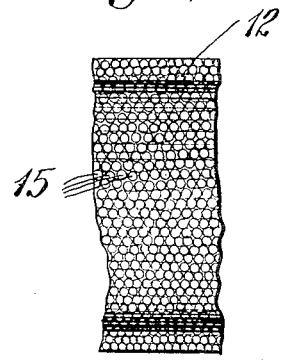
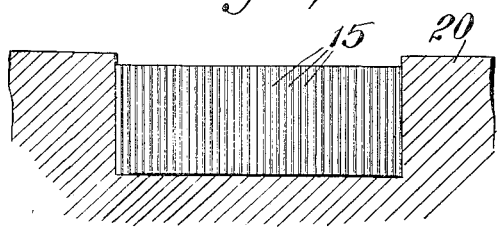
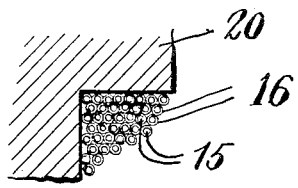
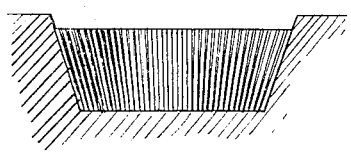

UNITED STATES PATENT OFFICE.

EDWIN H. MESSITER, OF BROOKLYN, NEW YORK, ASSIGNOR TO ELECTRIC WEIGHING COMPANY, OF NEW YORK, N. Y., A CORPORATION OF NEW YORK.

COMPOSITE MAGNETIZABLE MATERIAL.

1,121,859.

Specification of Letters Patent.

Patented Dec. 22, 1914.

Application filed November 8, 1912. Serial No. 730,135.

*To all whom it may concern:*

Be it known that I, EDWIN H. MESSITER, a citizen of the United States, and a resident of the borough of Brooklyn, county of Kings, and State of New York, have invented certain new and useful Improvements in Composite Magnetizable Material, of which the following is a specification, reference being had to the accompanying drawings, forming a part thereof.

My invention relates to composite magnetizable materials and it has for its object to provide a material of this character that shall be particularly adapted for the pole pieces of dynamo electric machines and for the core members of other electrical devices; and to a simple and novel process of producing the same.

In the drawings, Figure 1 is an elevation of a magneto generator having pole pieces composed of the material of my invention. Figs. 2 and 3 are respectively an end elevation and a fragmentary side view on a larger scale, of one of the pole pieces which forms a part of the machine of Fig. 1. Fig. 4 is a sectional elevation and Fig. 5 is a sectional plan view of a mold which may be used in producing the composite material of my invention. Fig. 6 is a view corresponding to Fig. 4 of a modified arrangement of my invention.

Like characters of reference designate corresponding parts in all the figures.

Referring to the drawings,—A magneto generator 10 comprises a stationary field frame 11, to which pole pieces 12—12 are secured, and an armature 13 having commutator brushes 14. The pole pieces are similar to each other and each of them is made of my improved composite magnetizable material which may be produced as follows: A large number of pieces of relatively small gage wire or rod such as 15 of iron or other magnetizable material, are assembled in a mold such as the mold 20 of Fig. 4, on end. The length of the pieces is determined by the overall length of the pole pieces to be produced (the length of the pole pieces being measured in the direction of the field flux). The wires are preferably circular in cross section and the small spaces between the wires are filled with molten brass or other brazing material in order to produce an integral structure, or mass, which may be machined or finished in any suitable manner, to the desired shape and size.

In order to facilitate the brazing process and to insure that the mass is solid and the magnetizable wires held firmly in position, the wires are preferably plated with tin before the molten brass is poured into the mold.

A convenient method is to utilize iron wire of the desired gage which has a coating 16 of tin on its surface and to then cut the tinned wire into the proper lengths for assembling in the mold.

It is not essential that the wires be placed in a mold having the form of a receptacle, but the wires may be assembled and bound or clamped in a bundle in any suitable manner and either dipped in molten brass or suspended so that their ends extend into the molten metal. In either case the capillary action will cause all of the interstices of the bundle to be filled with the molten metal.

The material may of course be produced in long bars or in a large mass which may be cut into pieces of the desired length and size as desired.

My novel material has the advantage of presenting a resistance to the passage through it, of magnetic flux in a direction transverse to the magnetizable wires, which is many times in excess of the reluctance of the material of which the wires is composed, while the resistance to the passage of flux in a direction longitudinal of the wires is substantially dependent upon the permeability of the wires themselves.

By utilizing this material for pole pieces and other core members of electric apparatus, and forming the core members so that the normal flux tends to traverse the material in the direction of the wires, it is possible to very largely prevent cross fluxes and thus to avoid the distortive and other injurious effects of such fluxes. For example, by utilizing the material for pole pieces as shown in Fig. 1, the distortive effect of the armature reaction of the dynamo electric machine is largely obviated and the operating characteristics of the machine materially improved.

It is not only possible to avoid sparking at the commutator brushes of dynamo electric machines which operate under varying conditions of speed and load, but also of such machines as are adapted for operation alternately as a motor and a generator.

As shown in Fig. 6 the wires or rods are not necessarily parallel and may be more widely separated at one end than at the other. They may also be bent instead of straight, to meet the requirements of the service to which the structure is to be applied.

What I claim is:

1. A composite magnetizable material consisting of a plurality of rods or wires of magnetizable material, assembled in a bundle and brazed into an integral structure.

2. A composite magnetizable material consisting of a plurality of magnetizable rods or wires coated with metal having a lower melting point and brazed into an integral structure.

3. A composite magnetizable material consisting of a plurality of magnetizable rods or wires coated with tin and brazed in parallelism into an integral structure.

4. A composite magnetizable material consisting of a plurality of rods or wires of magnetizable material and a metal bond which holds the rods or wires in an integral mass.

5. A composite magnetizable material consisting of a plurality of magnetizable members assembled in parallelism and a non-magnetizable bond united with the magnetizable members to hold them together and to form an integral mass.

6. A composite magnetizable material comprising metals of unlike permeability united in an integral mass, with metal of high permeability in a plurality of filaments separated from each other by metal of low permeability.

7. A process of producing a magnetizable material that consists in assembling a group of magnetizable rods or wires in parallelism and filling the interstices with brass in the molten state.

8. A process of producing a magnetizable material that consists in assembling a plurality of iron wires of circular cross section in parallelism in a mold and pouring in molten brass to fill the interstices of the bundle.

9. A process of producing a magnetizable material that consists in coating a magnetizable wire with tin, cutting the wire into a plurality of substantially equal lengths, assembling the lengths in a bundle in parallelism and uniting the tin coated wires into an integral structure.

10. A process of producing a magnetizable material that consists in coating a magnetizable wire with metal having a lower melting point, cutting the wire into a plurality of substantially equal lengths, assembling the lengths in a bundle and uniting the coated wires into an integral structure.

In witness whereof, I have hereunto set my hand this 7 day of November, 1912.

EDWIN H. MESSITER.

Witnesses:
F. GRAVES,
G. QUIMBY.